Oct. 28, 1924.
J. C. HORNUNG
1,513,508
HEATING APPARATUS
Filed May 23, 1921
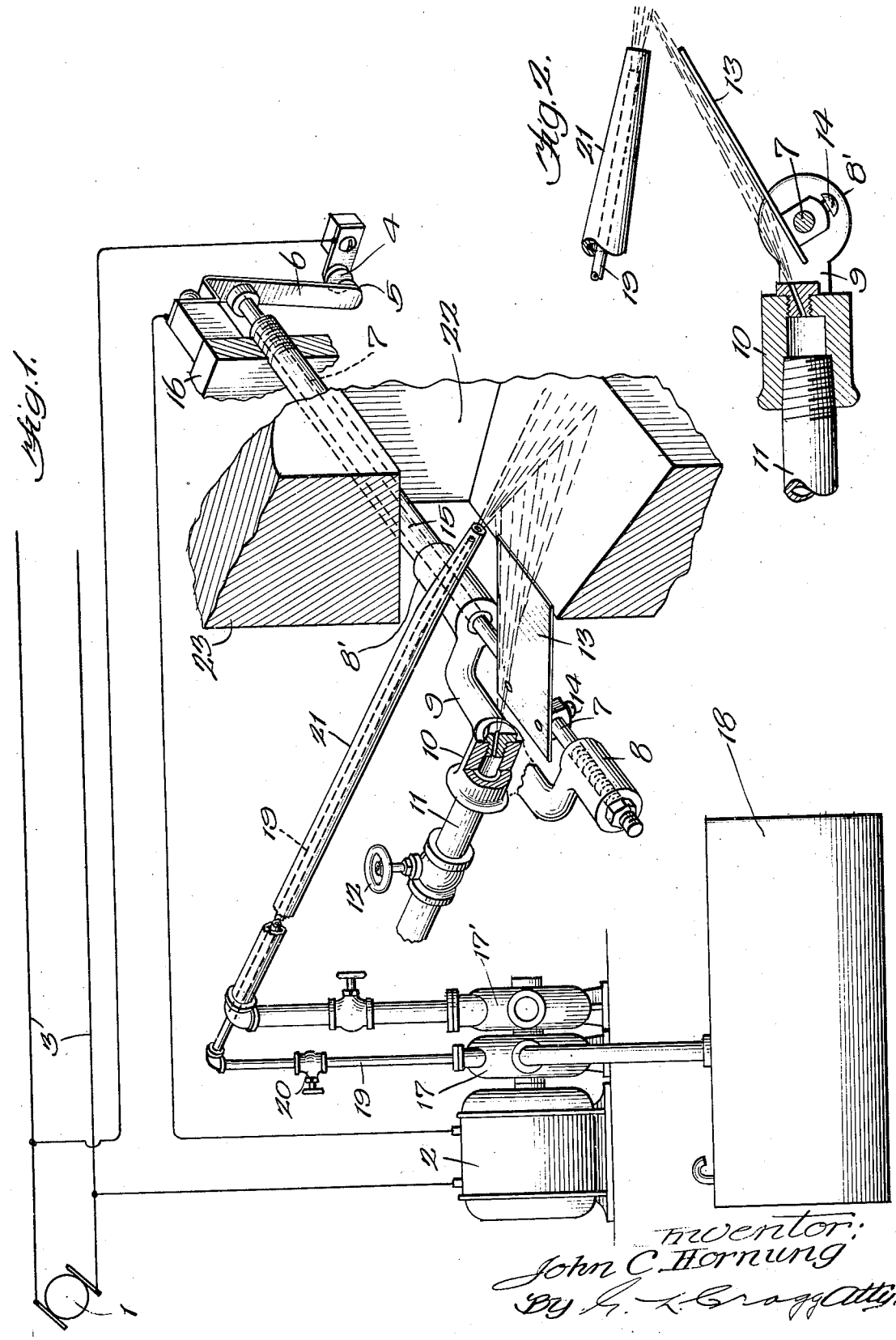

Patented Oct. 28, 1924.

1,513,508

UNITED STATES PATENT OFFICE.

JOHN C. HORNUNG, OF CHICAGO, ILLINOIS.

HEATING APPARATUS.

Application filed May 23, 1921. Serial No. 471,804.

*To all whom it may concern:*

Be it known that I, JOHN C. HORNUNG, citizen of the United States, residing at Chicago, in the county of Cook and State of Illinois, have invented a certain new and useful Improvement in Heating Apparatus, of which the following is a full, clear, concise, and exact description.

My invention relates to apparatus for heating fluid for any desired purpose and also to a thermo-motive device that may be employed to control the flow of the fluid that is to be heated.

In carrying out my invention I employ fluid conveying piping, fuel conveying piping provided with a burner positioned to heat the fluid conveyed to the fluid conveying piping, means for checking the passage of fluid through said fluid conveying piping, and a thermo-motive device in controlling relation to said fluid checking means and subject to the heat of the burner flame, this thermo-motive member serving, when sufficiently cooled, to make said fluid checking means effective.

The apparatus of my invention is well adapted to the burning of oils or other hydro-carbons in furnaces and when the invention is thus employed the piping for conveying the fluid hydro-carbon is provided with a discharge nozzle through which the fluid that is to be burned is forced.

I preferably employ a pump for forcing the passage of fluid through the fluid conveying piping, an electric motor for operating said pump, and a switch for making the motor circuit effective and ineffective. The thermo-motive member is in operating relation to the switch, being preferably provided with a plate or body positioned to be subject to the heat of the burner flame, and serving, when sufficiently heated, to operate the switch to make the motor circuit effective and, when sufficiently cooled, to operate the switch to make the motor circuit ineffective, to check or stop the flow of pumped fluid.

In the preferred embodiment of the invention there is employed a bracket of U-form having the burner connected with its mid-portion, this burner being positioned to direct its flame into the space between the sides of the bracket. The thermo-motive member is anchored upon one end of the bracket and extending across the space between the sides of the bracket to be subject to the heat of the burner flame.

I will explain my invention more fully by reference to the accompanying drawing in which Fig. 1 is a view, somewhat diagrammatic, illustrating the apparatus of my invention, parts of this apparatus being shown in perspective with portions broken away and shown in section; and Fig. 2 is a sectional view through the mid portion of the U-shaped bracket of the thermostat where the burner is located, the eduction nozzle of the fluid conveying piping being also indicated in this figure.

Like parts are indicated by similar characters of reference throughout the different figures.

The system shown includes any suitable source of electric current such as the diagrammatically illustrated generator 1. A motor 2 is bridged between the mains 3 that extend from the generator. A circuit opening and closing switch is included in the motor circuit, this switch being illustrated as having a stationary carbon contact 4 and a complemental carbon contact 5 carried upon a leaf spring 6. The contact 5 is engaged with the contact 4 by means of the expansible rod 7 constituting a thermo-motive member, this rod being preferably of solid brass. It engages the spring 6 at one end and is anchored at its other end upon the end 8 of one side of a U-shaped bracket 9, the rod 7 being shown as being in threaded connection with said bracket end. A burner 10 is connected with the mid portion of the bracket and is supplied with fluid fuel, such as gas, from a pipe 11 that carries the burner and the U-shaped bracket. A main valve 12 is provided in the pipe 11 whereby the flow of gas to the burner may be regulated or stopped. The rod 7 extends into and across the space between the sides of the bracket 9 so as to be subject to the heat of the burner flame and in order that said rod may be more subject to the heat of such burner flame, it is provided with a metallic plate or body 13 that is mounted upon the rod 7 by means of screws 14. The valve 12 being opened, the gas issuing through the burner 10 is ignited by means of a match. The plate 13 is preferably so positioned that the gas flame will impinge upon it whereby heat from the burner flame is effectively communicated to the rod 7. Another element 15 of the device is anchored to the remaining end 8' of the bracket and extends away from the space between the sides of the bracket to be less subject to the heat of the burner flame. Moreover this element 15 is preferably made of iron so as to have a coefficient of expansion that is different from that of the rod 7. The thermostatic element 15 is desirably in the form of a sleeve through which the rod 7 freely passes, this sleeve being threaded at one end into the bracket end 8' and carrying at its other end the mounting 16 for the contact spring 6, the element 15 being also preferably in threaded connection with this mounting. If the heat of the burner flame that impinges upon the plate 13 is sufficient, the rod 7 will expand sufficiently to press upon the spring 6 in a manner to engage the contact 5 with the contact 4 whereby the circuit of the motor 2 is closed.

As illustrated, this motor is provided for driving a pump 17 that draws oil or other fluid from a suitable source 18 and forces the passage thereof through fluid conveying piping 19 provided with a hand valve 20 whereby the flow of fluid through this pipe may be regulated or stopped. The piping 19 is provided with a discharge nozzle 21 positioned to discharge the fluid such as oil or other hydro-carbon liquid into the flame at the burner whereby the fluid issuing through the nozzle is burned to produce heat. Said motor may also drive an air pump 17' to supply air to and mix it with the oil pumped by the pump 17, if the invention is used in an oil burning system.

As shown, the nozzle 21 and the burner 10 direct the fluids passing therethrough into an opening 22 in a furnace wall portion 23. If the flame at the burner 10 should be put out or reduced to an undesirable extent for any cause whatsoever, the thermo-motive rod 7 will be cooled sufficiently to permit the contact spring 6 to resume or approach its idle position due to the resilience of this spring, thereby opening the circuit of the motor at the contacts 4 and 5 to stop the operation of the motor and the operation of the pumps coupled therewith. Thus the flow of fluid through the pipe 19 is automatically checked in case the heat at the burner should be eliminated or reduced to an improper extent.

While I have herein shown the application of the burner flame directly to the fluid issuing from the pipe 21, I do not wish to be limited to the direct application of the flame to such fluid, nor do I wish to be limited to the employment of an electric motor for driving the pumps 17, 17'.

My invention is particularly useful in connection with furnaces that burn oil or other liquid hydro-carbon and when the invention is thus embodied the gas burner 10 serves as an igniter to ignite the oil issuing through the nozzle 21, said nozzle then serving as an oil burner. The burner 10, in addition to serving as an igniter, also co-operates with the thermo-motive member to stop the flow of oil through the oil burning nozzle when the heat generated at the burner 10 is eliminated or sufficiently reduced to cool the thermostatic rod 7 to a point where it will relieve its pressure upon the spring 6 to permit the spring to separate the contact 5 from the contact 4 and open the motor circuit to stop the operation of the pumps 17, 17'. The equipment of my invention thus affords ample protection against the discharge of unburnt oil into the furnace of an oil burning heating system.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a bracket of U-form; of a burner connected with the mid-portion of the bracket and positioned to direct its flame into the space between the sides of the bracket; and a thermo-motive device having two elements, one of these elements being anchored upon one end of the bracket and extending into the space between the sides of the bracket to be subject to the heat of the burner flame, while the other element is anchored to the remaining end of the bracket and extends away from the space between the sides of the bracket to be less subject to the heat of the burner flame.

2. The combination with a bracket of U-form; of a burner connected with the mid-portion of the bracket and positioned to direct its flame from the mid-portion of the bracket into the space between the sides of the bracket; and a thermo-motive member anchored upon one end of the bracket and extending into the space between the sides of the bracket to be subject to the heat of the burner flame.

3. The combination with a bracket of U-form; of a burner positioned to direct its flame into the space between the sides of the bracket; and a thermo-motive device having two elements, one of these elements being anchored upon one end of the bracket and extending into the space between the sides of the bracket to be subject to the heat of the burner flame, while the other element is anchored to the remaining end of the bracket and extends away from the space between the sides of the bracket to be less subject to the heat of the burner flame.

4. The combination with a bracket of U- form; of a burner positioned to direct its flame into the space between the sides of the bracket; and a thermo-motive member anchored upon one end of the bracket and extending into the space between the sides of the bracket to be subject to the heat of the burner flame.

5. The combination with a bracket; of a burner supported thereby; a thermo-motive device having two elements carried by said bracket, one of these elements being positioned to be more subject to the heat of the burner flame than the other; and a lateral extension upon the element that is more subject to the heat of the burner flame and itself more directly subject to the heat of the burner flame.

6. The combination with a bracket of U-form; of a burner connected with the mid-portion of the bracket and positoned to direct its flame into the space between the sides of the bracket; a thermo-motive device having two elements, one of these elements being anchored upon one end of the bracket and extending into the space between the sides of the bracket to be subject to the heat of the burner flame, while the other element is anchored to the remaining end of the bracket and extends away from the space between the sides of the bracket to be less subject to the heat of the burner flame; and a lateral extension upon the element that is more subject to the heat of the burner flame and itself more directly subject to the heat of the burner flame.

7. The combination with a bracket of U-form; of a burner connected with the mid-portion of the bracket and positioned to direct its flame into the space between the sides of the bracket; a thermo-motive member anchored upon one end of the bracket and extending into the space between the sides of the bracket to be subject to the heat of the burner flame; and a lateral extension upon said thermo-motive member and itself more directly subject to the heat of the burner flame.

8. The combination with a bracket of U-form; of a burner positioned to direct its flame into the space between the sides of the bracket; a thermo-motive device having two elements, one of these elements being anchored upon one end of the bracket and extending into the space between the sides of the bracket to be subject to the heat of the burner flame, while the other thermostat element is anchored to the remaining end of the bracket and extends away from the space between the sides of the bracket to be less subject to the heat of the burner flame; and a lateral extension upon the element that is more subject to the heat of the burner flame and itself more directly subject to the heat of the burner flame.

9. The combination with a bracket of U-form; of a burner positioned to direct its flame into the space between the sides of the bracket; a thermo-motive member anchored upon one end of the bracket and extending into the space between the sides of the bracket to be subject to the heat of the burner flame; and a lateral extension upon said thermo-motive member and itself more directly subject to the heat of the burner flame.

10. The combination with a bracket; of a burner upon the bracket; a thermo-motive device having two elements carried by said bracket, one of these elements being positioned to be more subject to the heat of the burner flame than the other; and a lateral extension upon the thermo-motive element that is more subject to the heat of the burner flame and positioned to be impinged upon by the burner flame.

In witness whereof, I hereunto subscribe my name this fourteenth day of April, A. D. 1921.

JOHN C. HORNUNG.